United States Patent
Uniyal (10) Patent No.: US 9,489,242 B2
(45) Date of Patent: Nov. 8, 2016

(54) ALGORITHM FOR FASTER CONVERGENCE THROUGH AFFINITY OVERRIDE

(71) Applicant: Telefonaktiebolaget L M Ericsson (publ), Stockholm (SE)

(72) Inventor: Ramesh Uniyal, Ashburn, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 45 days.

(21) Appl. No.: 14/502,906

(22) Filed: Sep. 30, 2014

(65) Prior Publication Data

US 2016/0092270 A1 Mar. 31, 2016

(51) Int. Cl.
*G06F 9/50* (2006.01)
*G06F 9/455* (2006.01)
*H04L 12/54* (2013.01)
*H04L 12/707* (2013.01)

(52) U.S. Cl.
CPC ............ *G06F 9/505* (2013.01); *G06F 9/50* (2013.01); *H04L 12/5689* (2013.01); *H04L 45/22* (2013.01); *G06F 9/45533* (2013.01)

(58) Field of Classification Search
CPC .......... G06F 9/50; G06F 9/48–9/4812; G06F 9/505; G06F 9/45533
See application file for complete search history.

(56) References Cited

U.S. PATENT DOCUMENTS

| | | | |
|---|---|---|---|
| 6,185,619 B1* | 2/2001 | Joffe | G06F 9/505 709/223 |
| 6,289,369 B1* | 9/2001 | Sundaresan | G06F 9/505 718/100 |
| 6,658,448 B1* | 12/2003 | Stefaniak | G06F 9/5033 712/1 |

(Continued)

FOREIGN PATENT DOCUMENTS

EP 2207312 A1 7/2010

OTHER PUBLICATIONS

Tsai et al., A port-configuration assisted NIC IRQ affinitization scheme for multi-core packet forwarding applications, [Online] 2012, Global Communications Conference (GLOBECOM), 2012 IEEE, Anaheim, CA, 2012, [Retrieved from the Internet] <http://ieeexplore.ieee.org/stamp/stamp.jsp?tp=&arnumber=6503500 &isnumber=6503052> pp. 2547-2552.*

(Continued)

*Primary Examiner* — Thuy Dao
*Assistant Examiner* — Ravi K Sinha
(74) *Attorney, Agent, or Firm* — Nicholson De Vos Webster & Elliott, LLP (57) ABSTRACT

A method is implemented by a network device having a symmetric multi-processing (SMP) architecture. The method improves response time for processes implementing routing algorithms in a network. The method manages core assignments for the processes during a network convergence process. The method includes determining a number of interrupts or system events processed by a subset of cores of a set of cores of a central processing unit and identifying a core within the subset of cores with a lowest number of interrupts or system events processed. The method further includes changing an affinity mask of at least one process implementing the routing algorithms during the network convergence to target the core within the subset of cores with a lowest number of interrupts or system events processed.

12 Claims, 5 Drawing Sheets

(56) References Cited

U.S. PATENT DOCUMENTS

| | | | | |
|---|---|---|---|---|
| 7,401,112 | B1* | 7/2008 | Matz | G06F 9/5038 379/265.02 |
| 7,996,696 | B1* | 8/2011 | Haney | G06F 9/505 713/300 |
| 9,104,490 | B2* | 8/2015 | Semin | G06F 9/4812 |
| 9,389,894 | B1* | 7/2016 | Zhang | G06F 9/45533 |
| 2002/0120744 | A1* | 8/2002 | Chellis | G06F 9/50 709/226 |
| 2008/0046895 | A1* | 2/2008 | Dillenberger | G06F 9/505 718/105 |
| 2008/0304516 | A1* | 12/2008 | Feng | G06F 9/5038 370/468 |
| 2009/0034542 | A1* | 2/2009 | He | H04L 45/00 370/400 |
| 2009/0249094 | A1* | 10/2009 | Marshall | G06F 1/3203 713/320 |
| 2011/0010581 | A1* | 1/2011 | Tanttu | G06F 9/505 714/11 |
| 2011/0022706 | A1* | 1/2011 | Borghetti | G06F 9/505 709/224 |
| 2011/0087814 | A1 | 4/2011 | Liu et al. | |
| 2012/0134320 | A1 | 5/2012 | Khawer et al. | |
| 2013/0097319 | A1* | 4/2013 | Ahmad | G06F 9/45533 709/226 |
| 2013/0176850 | A1 | 7/2013 | Mishra et al. | |
| 2013/0283286 | A1* | 10/2013 | Lee | G06F 9/50 718/104 |
| 2013/0318221 | A1* | 11/2013 | Anaya | G06F 9/505 709/223 |
| 2014/0059228 | A1* | 2/2014 | Parikh | G06F 9/505 709/226 |
| 2014/0059229 | A1* | 2/2014 | Parikh | G06F 9/50 709/226 |
| 2014/0095693 | A1* | 4/2014 | Apte | G06F 9/505 709/224 |
| 2014/0143777 | A1* | 5/2014 | Guo | G06F 9/50 718/1 |
| 2014/0189701 | A1* | 7/2014 | Semin | G06F 9/505 718/104 |
| 2015/0006734 | A1* | 1/2015 | Parikh | G06F 9/50 709/226 |
| 2015/0026681 | A1* | 1/2015 | Lin | G06F 9/45533 718/1 |
| 2015/0095912 | A1* | 4/2015 | Semin | G06F 9/5033 718/102 |
| 2015/0193246 | A1* | 7/2015 | Luft | G06F 9/45533 718/1 |
| 2015/0355946 | A1* | 12/2015 | Kang | G06F 9/5011 718/104 |

OTHER PUBLICATIONS

Ahuja et al., Cache-aware affinitization on commodity multicores for high-speed network flows, [Online] 2012, in Proceedings of the eighth ACM/IEEE symposium on Architectures for networking and communications systems, ACM, New York, NY, USA, [Retrieved from the Internet] <http://dx.doi.org/10.1145/2396556.2396564> pp. 39-48.*

Nagarajan, Shiv, and Nicola, Vulpe, Processor Affinity or Bound Multiprocessing?, [Online] 2009, QNX Software Systems whitepaper, [Retrieved from the Internet] <http://qnx.symmetry.com.au/resources/whitepapers/qnx_bmp_vs_processor_affinity.pdf> 9 pages total.*

Babiarz, J., et al., "Configuration Guidelines for DiffServ Service Classes", Network Working Group, Request for Comments: 4594, The Internet Society, (Aug. 2006), 57 pages.

Baker, F., "A Differentiated Services Code Point (DSCP) for Capacity-Admitted Traffic", Internet Engineering Task Force (IETF), Request for Comments: 5865, IETF Trust, (May 2010), 14 pages.

Baker, F., et al., "Management Information Base for the Differentiated Services Architecture", Network Working Group, Request for Comments: 3289, The Internet Society, (May 2002), 116 pages.

Bernet, Y., et al., "An Informal Management Model for Diffserv Routers", Network Working Group, Request for Comments: 3290, The Internet Society, (May 2002), 56 pages.

Black, D., "Differentiated Services and Tunnels", Network Working Group, Request for Comments: 2983, The Internet Society, (Oct. 2000), 14 pages.

Black, D., et al., "Per Hop Behavior Identification Codes", Network Working Group, Request for Comments: 3140, The Internet Society, (Jun. 2001), 8 pages.

Blake, S., et al., "An Architecture for Differentiated Services", Network Working Group, Request for Comments 2475, The Internet Society, (Dec. 1998), 36 pages.

Borman, D., et al., "IPv6 Jumbograms", Network Working Group, Request for Comments: 2675, The Internet Society, (Aug. 1999), 9 pages.

Chan, K., et al., "Differentiated Services Quality of Service Policy Information Base", Network Working Group, Request for Comments: 3317, The Internet Society, (Mar. 2003), 96 pages.

Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.

Davie, B., et al., "An Expedited Forwarding PHB (Per-Hop Behavior)", Network Working Group, Request for Comments: 3246, The Internet Society, (Mar. 2002), 16 pages.

Deering, S., et al., "Internet Protocol, Version 6 (IPv6)", Dec. 1998, 39 pages, Network Working Group, Request for Comments: 2460, The Internet Society.

Eggert, L., et al., "Unicast UDP Usage Guidelines for Application Designers", Network Working Group, Request for Comments: 5405, IETF Trust and the persons identified as the document authors, (Nov. 2008), 27 pages.

Fenner, B., et al., "Management Information Base for the User Datagram Protocol (UDP)", Network Working Group, Request for Comments: 4113, The Internet Society, (Jun. 2005), 19 pages.

Grossman, D., "New Terminology and Clarifications for Diffserv", Network Working Group, Request for Comments: 3260, The Internet Society, (Apr. 2002), 10 pages.

Heinanen, J., et al., "Assured Forwarding PHB Group", Jun. 1999, 11 pages, Network Working Group, Request for Comments: 2597, The Internet Society.

Housley, R., et al., "Using Advanced Encryption Standard (AES) CCM Mode with IPsec Encapsulating Security Payload (ESP)", Network Working Group; RFC 4309; Dec. 2005; 13 pages.

Information Sciences Institute, University of Southern C., "Transmission control protocol darpa internet program protocol specification", Sep. 1981, Request for Comments: 793, 91 pages.

Kent, S., et al., ""Security Architecture for the Internet Protocol",", RFC 4301, Dec. 2005.

Nichols, K., et al., "Definition of Differentiated Services Per Domain Behaviors and Rules for their Specification", Network Working Group, Request for Comments: 3086, The Internet Society, (Apr. 2001), 24 pages.

Nichols, K., et al., "Definition of the Differentiated Services Field (DS Field) in the IPv4 and IPv6 Headers", Network Working Group, Request for Comments: 2474, The Internet Society, (Dec. 1998), 20 pages.

Postel, J., ""User Datagram Protocol",", Aug. 28, 1980, 3 pages, RFC 768.

Socolofsky, T., et al., "A TCP/IP Tutorial", Network Working Group, Request for Comments: 1180, (Jan. 1991), 28 pages.

Kerrisk, Michael, "The Linux man-pages project," available at <https://www.kernel.org/doc/man-pages/index.html>, Downloaded Apr. 26, 2016, using InternetArchive as published May 27, 2014 from <http://web.archive.org/web/20140527142304/https://www.kernel.org/doc/man-pages/>, 1 page.

* cited by examiner

ALGORITHM FOR FASTER CONVERGENCE THROUGH AFFINITY OVERRIDE

FIELD

Embodiments of the invention relate to the field of path computation. Specifically, the embodiments relate to a method for computing paths in a device with a symmetric multi-processing (SMP) architecture by overriding core assignment affinities during a convergence process.

BACKGROUND

A SMP architecture is a system with centralized shared memory operating under a single operating system (OS). A device such as a computing device or network device that has an SMP architecture has a set of homogenous processors or "cores" executing processes independent of one another. The cores can be components on the same physical die or similarly tightly coupled processing elements. This tightly coupled set of processing elements, either processors or cores, can be referred to as a central processing unit (CPU). The processors or cores, referred to herein simply as cores, for sake of convenience and clarity, share a main memory and each have separate caches.

In the SMP based architecture, a scheduler of the OS decides which core a process will run on. Each process is assigned an affinity mask by the OS, which is a set of bits that each correspond to one of the available cores indicating whether the respective core is preferred for process assignment for the corresponding process. By default, the process's affinity mask is set to all 1 s, meaning that the scheduler is allowed to dispatch this process to any core without any preference, instead determining the assignment based on whichever core is idle. The affinity mask associated to a process can be changed to include or exclude certain cores and if so configured then the scheduler will dispatch the process only to those cores that are set in the affinity mask. The scheduler will assign each process a core and give it a set of time or cycles for execution, referred to as a time slice. However, once the affinity mask is set, the OS will not change it automatically to better utilize unused processors or cores even if a process has to wait to be executed by the assigned core while other cores are available.

When there is heavy demand for the resources of the CPU (i.e., the main memory and cores) by multiple processes at the same time and each process needs an assigned core of the CPU for much longer than its time slice then OS performance is hit by continuous cache clean up that occurs in each core because under SMP architecture the processes get dispatched randomly to any core whichever is available. The OS performance is hit the worst if an interrupt storm (a large number of clustered interrupts) also occurs during the high CPU usage interval because some interrupts are handled by the OS on designated cores only and this increases the likelihood that a process's data in the cache of the assigned core will be cleared before it gets rescheduled on the same core next time.

On the other hand if a process's affinity is set permanently to a fixed core then the process loses the advantage of operating in a multi-processor or multi-core system (i.e., an SMP architecture), because if the assigned cores are busy when the process needs CPU resources, then the process will have to wait for them to become free even though the other cores in the system were available.

SUMMARY

A method is implemented by a network device having a symmetric multi-processing (SMP) architecture. The method improves response time for processes implementing routing algorithms in a network. The method manages core assignments for the processes during a network convergence process. The method includes determining a number of interrupts or system events processed by a subset of cores of a set of cores of a central processing unit and identifying a core within the subset of cores with a lowest number of interrupts or system events processed. The method further includes changing an affinity mask of at least one process implementing the routing algorithms during the network convergence to target the core within the subset of cores with a lowest number of interrupts or system events processed.

A network device has a symmetric multi-processing (SMP) architecture configured to execute a method to improve response time for processes implementing routing algorithms in a network. The method manages core assignments for the processes during a network convergence process. The network device includes a non-transitory machine-readable storage medium configured to store an operating system for the network device and an affinity override module and a processor communicatively coupled to the non-transitory machine-readable storage medium. The processor has a set of cores for executing processes. The processor is configured to execute the operating system and the affinity override module. The affinity override module is configured to determine a number of interrupts or system events processed by a subset of cores of the set of cores, to identify a core within the subset of cores with a lowest number of interrupts or system events processed, and to change an affinity mask of at least one process implementing the routing algorithms during the network convergence to target the core within the subset of cores with a lowest number of interrupts or system events processed.

A computing device has a symmetric multi-processing (SMP) architecture implementing a plurality of virtual machines for implementing network function virtualization (NFV), wherein a virtual machine from the plurality of virtual machines is configured to execute a method to improve response time for processes implementing routing algorithms in a network. The method manages core assignments for the processes during a network convergence process. The computing device includes a non-transitory machine-readable storage medium configured to store an operating system for the network device and an affinity override module, and a computer processor communicatively coupled to the non-transitory machine-readable storage medium. The computer processor executes a virtual machine from the plurality of virtual machines. The computer processor has a set of cores for executing processes. The computer processor is configured to execute the virtual machine that implements the operating system and the affinity override module. The affinity override module is configured to determine a number of interrupts or system events processed by a subset of cores of the set of cores, to identify a core within the subset of cores with a lowest number of interrupts or system events processed, and to change an affinity mask of at least one process implementing the routing algorithms during the network convergence to target the core within the subset of cores with a lowest number of interrupts or system events processed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for efficient execution of high CPU demand and time sensitive processes in an SMP architecture. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

The throughput of a process or set of processes in computing device having an SMP architecture can be improved by changing the affinity masks of each process dynamically, particularly in response to computationally intensive events. The affinity masks of processes that are integral to handling the event can be updated to prefer assignments to cores that have been processing fewer interrupts than the other cores in the set of cores in a CPU. A 'set,' as used herein refers to any positive while number of items including one item. In the case of a CPU, the set of cores will include at least two cores. An affinity override process tracks the handling of interrupts and other similar events by each of the cores to enable the dynamic update of the affinity masks including the quick identification of the cores with that have been handling the least number or interrupts or similar events in a given time window.

The prior art for the handling of core assignments for processes does not take into account the recent usage of the cores particularly as it relates to interrupt and similar event handling. Rather, the core assignments are generally fixed or non-responsive to recent interrupt handling or events. The core assignments may be made to whatever cores are currently available, without regard to whether the core may be a designated core for handling interrupts or similar events. In such cases, during certain events the processes can be interrupted and the data in the caches can be flushed thereby decreasing the efficiency and speed at which a particular event can be handled.

Figure 1:
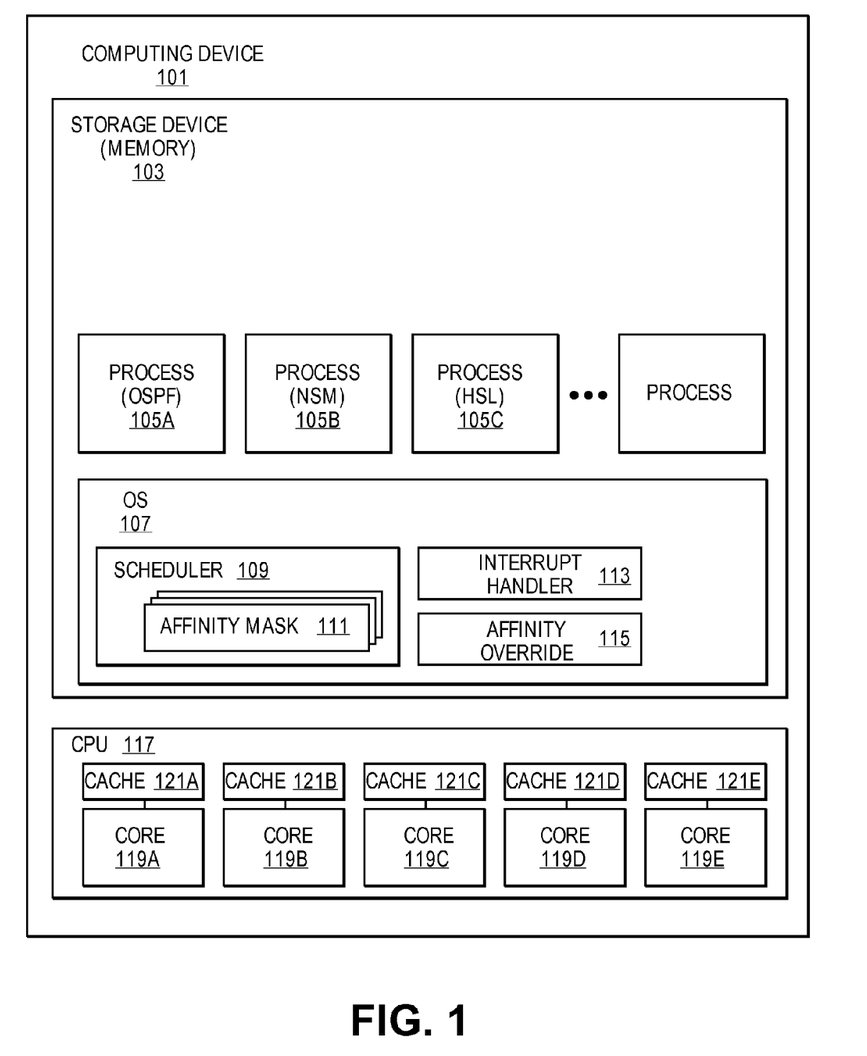
FIG. 1 is a diagram of one embodiment of a computing device having an SMP architecture.

FIG. 1 is a diagram of one embodiment of a computing device having an SMP architecture. In one embodiment, the computing device 101 includes a storage device 103 and a central processing unit (CPU) 117. The CPU can be any type of processing device having a set of homogeneous processing elements such as cores 119A-E. There can be any number or arrangement of cores 119A-E such that each core has similar processing capabilities. In one embodiment, each of the cores 119A-E is on the same physical die with the other cores. In other embodiments, the process can be implemented with cores, processors or similar processing elements that are not on the same die, but that are in close communication within the same computing device 101. Each of the cores 119A-E can have a separate cache 121A-E or similar local storage device in which data and instructions for the processes being executed by the associated cores 119A-E are being stored. The caches 12A-B can be any size or type and can be on the same die or similarly integral to the CPU 117. In other embodiments, the caches 121A-E can be off die or similarly external to the CPU 117, but in close proximity to the CPU 117 and within the computing device 101.

The computing device 101 also includes the storage device 103 that can be referred to as the main memory of the computing device 101. The storage device 103 can be any type of storage device including dynamic random access memory (DRAM), an optical storage device, a magnetic storage device or similar storage device capable to store processes and their data to be executed by the computing device 101 as well as the operating system 107 that manages the resources of the computing device 101 including the scheduling of the processes 105A-C to the cores 119A-E.

The OS can include a scheduler 109, interrupt handler 113 and affinity override 115, amongst other components for managing the resources of the computing device 101. The OS can be any type of OS capable of managing an SMP architecture. The interrupt handler 113 manages many types of system events and interrupts that preempt the normal scheduling of processes by the scheduler 109. The interrupt handler 113 and related processes can be assigned to particular cores 119A-E or may be predominantly handled by particular cores 119A-E in the CPU 117. Thus, the interrupt handling can degrade the efficiency and speed with which other processes are handled if assigned to the same cores 119A-E in part due to the loss of the process data in the corresponding caches that must then be reloaded.

The scheduler 109 handles the assignment and time allotment of processes 105A-C to the cores 119A-E. The scheduler 109 can implement any number of scheduling algorithms that utilize an affinity mask 111 and the current utility of cores 119A-E to make assignments and time allotments. The affinity mask 111 is a data structure that identifies on a per process basis, which processes prefer assignment to particular cores 119A-E such that the scheduler can give first priority to assigning these processes to these designated cores 119A-E.

The affinity override 115 tracks interrupt handling and frequency for each of the cores 119A-E. The affinity override can then update the affinity masks of processes related to particular events to set their affinity masks to avoid those cores that are likely to be servicing interrupts during the particular events that the processes are tied to. For example, in the case of processing a network convergence those processes that implement the network convergence are crucial and their responsiveness and speed dictate the overall performance of the network convergence process, such as a hardware specific layer (HSL) process 105C of a routing suite (such as the Ericsson Routing Suite (ERS) by Ericsson of Stockholm, Sweden). Other processes in such events can include the Open Shortest Path First (OSPF) process 105A, the network service module (NSM) process 105B or similar processes.

Example uses provided herein relate to the overall network convergence process and the related implementing processes such as the HSL process 105C, NSM process 105B and the OSPF process 105A. However, one skilled in the art would understand that other general processes and their related subprocesses can also be optimized by use of the affinity override process 115. The structures, functions and principles described herein with regard to network convergence are equally applicable to other similar intensive processes such as processes that operate in short time windows and require high levels of computing resources whose performance is significantly impacted by core processor availability and efficient caching.

Figure 2:
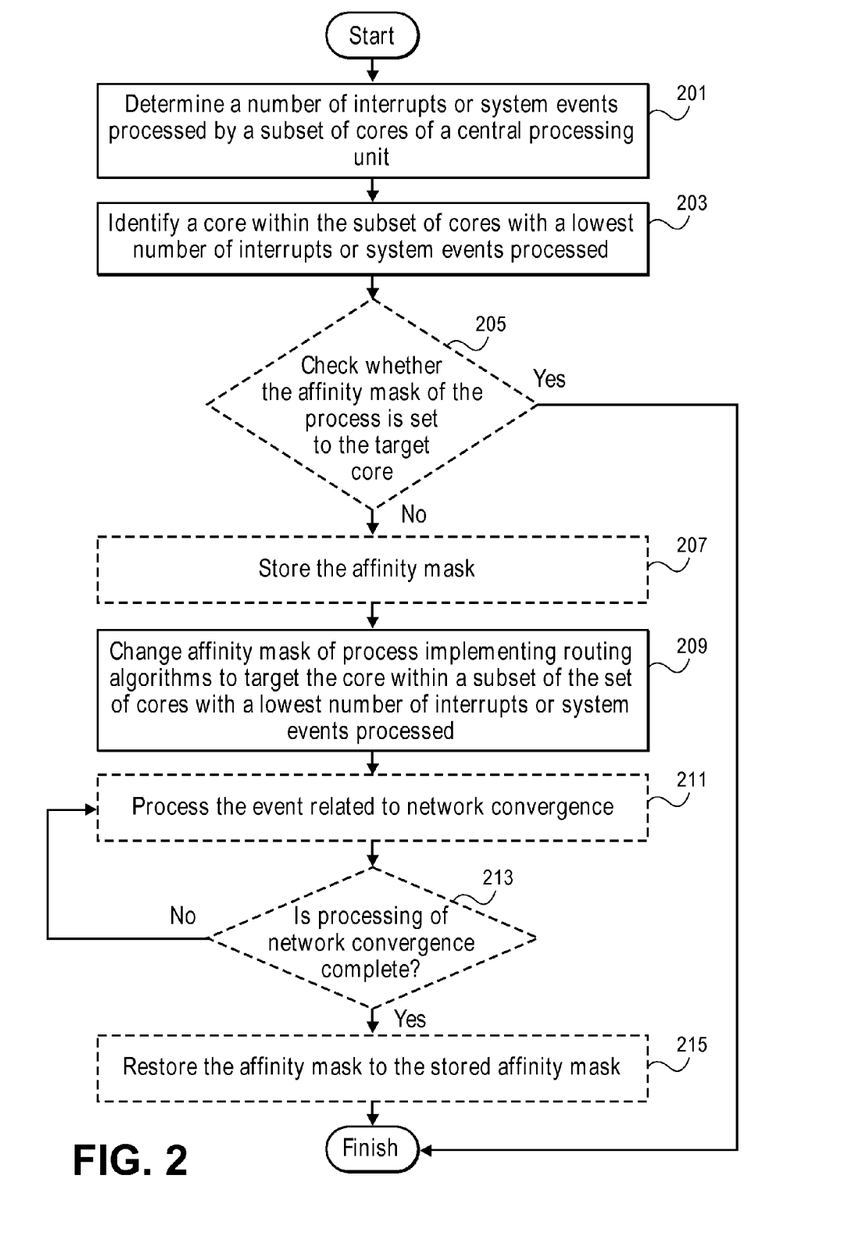
FIG. 2 is a flowchart of one embodiment of the affinity override process.

FIG. 2 is a flowchart of one embodiment of the affinity override process. The illustrated override process can be triggered whenever a designated event occurs that requires a set of processes to service the event in need of core assignments that have minimal interruption. In one example embodiment, this is the initiation of a network convergence process. In one embodiment, the affinity override process begins with the determination of a number of interrupts or system events processed by a subset of the cores of a central processing unit (Block 201). The monitoring and tracking of these interrupts and system events can be continuous and can cover any time frame or duration preceding the event triggering this process. The monitoring and tracking can track any number and variety of types of interrupts and system events that impact the cores of the CPU. This interrupt and system event monitoring data can be tracked in any type of data structure and can be accessed for use in further analysis as set forth herein below. The monitoring and tracking of the interrupt and system event core assignments can be carried out by the affinity override, the scheduler, the interrupt handler or similar component of the operating system. The set of cores for which data is tracked or retrieved can be any subset or the entire set of the cores in the CPU depending on system configuration.

Using the retrieved or accessed interrupt and system event tracking data, the affinity override can identify a core within the subset of cores that has had the least number, shortest duration or similar minimal metric for the usage of the cores (Block 203). In other embodiments, any number of cores can be identified that have the least usage or approximately the least usage, for example the two least used where two core assignments are needed. A check is then made whether the affinity mask of the process in need of the identified (target) highly available core already has its affinity mask set to this target core (Block 205). If the affinity mask already identifies the target core as the core to be utilized for this process, then no further work needs to be done and the override process can complete. However, where the affinity mask does not identify this target core, then further work to change the affinity mask is carried out.

In this case, the override process stores the current affinity mask of the process being handled by the affinity override (Block 207). The current affinity mask can be stored in any data structure accessible to the affinity override. The current affinity mask is stored so that it can be restored once the override process and its associated high demand specific process has completed and the assignments of the cores can go back to a normal operation. Once the current affinity mask of the specific process has been backed up, then the affinity mask in use can be changed to indicate that the target core within the subset of the cores with a lowest metric (i.e., measuring a frequency or impact of interrupts or system events on the cores of the CPU) should be utilized to service the specific high demand process, for example a routing algorithm or associated hardware specific layer. Once the affinity mask has been updated then the triggering event (e.g., a network convergence) can be processed (Block 211) where the scheduler will use the identified core in affinity mask of the specific processes of the event such as HSL and/or OSPF in the case of a network convergence event. A check is then made to determine when the event triggering the override processes have completed, e.g., the network convergence events (Block 213). If the processing of the event is not completed then the check is repeated until the processing is completed.

Once the processing has completed, then the original affinity mask is restored (Block 215). The original affinity mask of each process is used to overwrite the modified affinity mask. Thus, the affinity mask is restored to its prior state from the temporary override state and the override process can complete leaving the affinity masks of affected processes in the same state they were in prior to the event triggering the override process.

Example Embodiments

Figure 3:
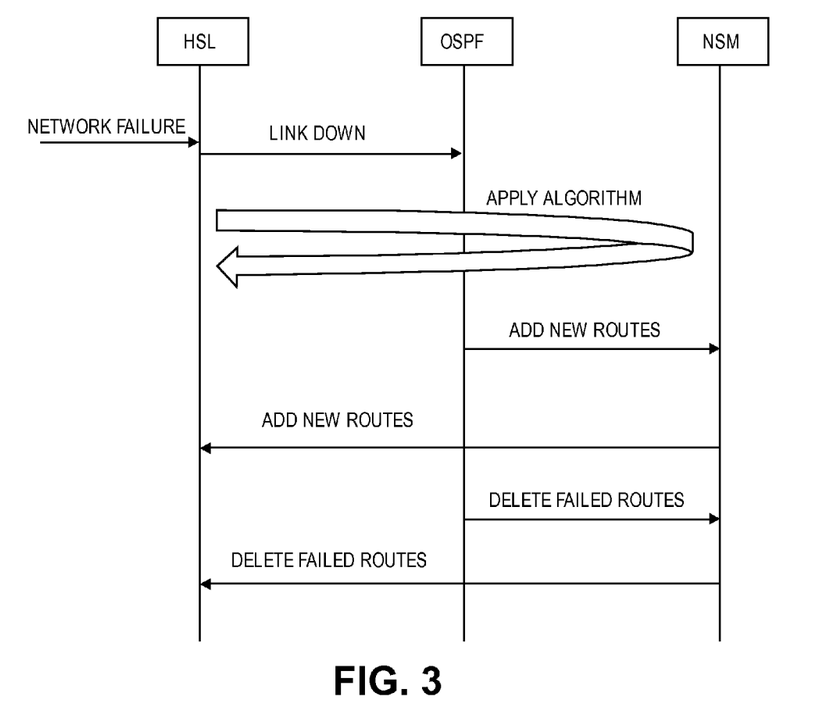
FIG. 3 is a diagram of one embodiment a convergence process where affinity override is utilized.

FIG. 3 is a diagram of one embodiment a convergence process where affinity override is utilized. In this example of a network convergence being started in response to a detected network failure, there are three primary processes that handle the network convergence process. The HSL process, the NSM process and the OSPF process implement the network convergence. The HSL process interfaces with the hardware of the computing device and reports specific hardware failure or network failure events to the OSPF process. The network convergence include the following actions, (1) finding alternative alternate routes to all the affected destinations, (2) programming the new routes in the hardware for the forwarding path, and (3) cleaning up the failed routes from the forwarding path. Each of these actions is CPU intensive and the higher the number of affected routes in the network, the higher the CPU demand by these three processes.

The OSPF process in the diagram is responsible for finding the alternate routes to the affected destinations and if alternate routes are available then it sends these new routes to the NSM process to update the routing information base and then the NSM sends those routes to the HSL process to program them in the forwarding plane in the hardware. In this example, the affinity override process is applied to the HSL process as soon as the OSPF process learns about the link down event, which signals that a network convergence is being performed and the affinity override can improve the responsiveness of the computing device to the event.

Figure 4:
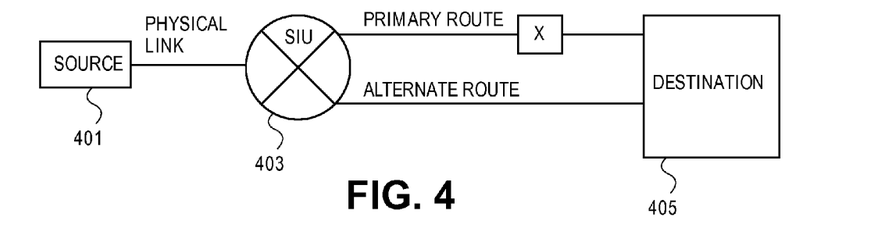
FIG. 4 is a diagram of one embodiment of a network in which the affinity override process is implemented by a site integration unit (SIU).

FIG. 4 is a diagram of one embodiment of a network in which the affinity override process is implemented by a site integration unit (SIU). In the block diagram, an SIU is illustrated as part of a network positioned between a source node and a destination node. The SIU is connected with each of these nodes through physical links with the connection to the destination node being through two links that have been categorized as a primary route and an alternate or backup route. In this example, the SIU forwards data traffic originating from the source node to the destination node. The SIU initially forwards the data traffic over the primary route as long as it is available. However, in the event of a failure on the primary route, the SIU will switch to forwarding the data traffic over the alternate or backup route. In this context, the SIU may implement the affinity override process as described herein above to facilitate this transition and to provide the fastest and most efficient transition as described above in regard to FIG. 3.

Figure 5:
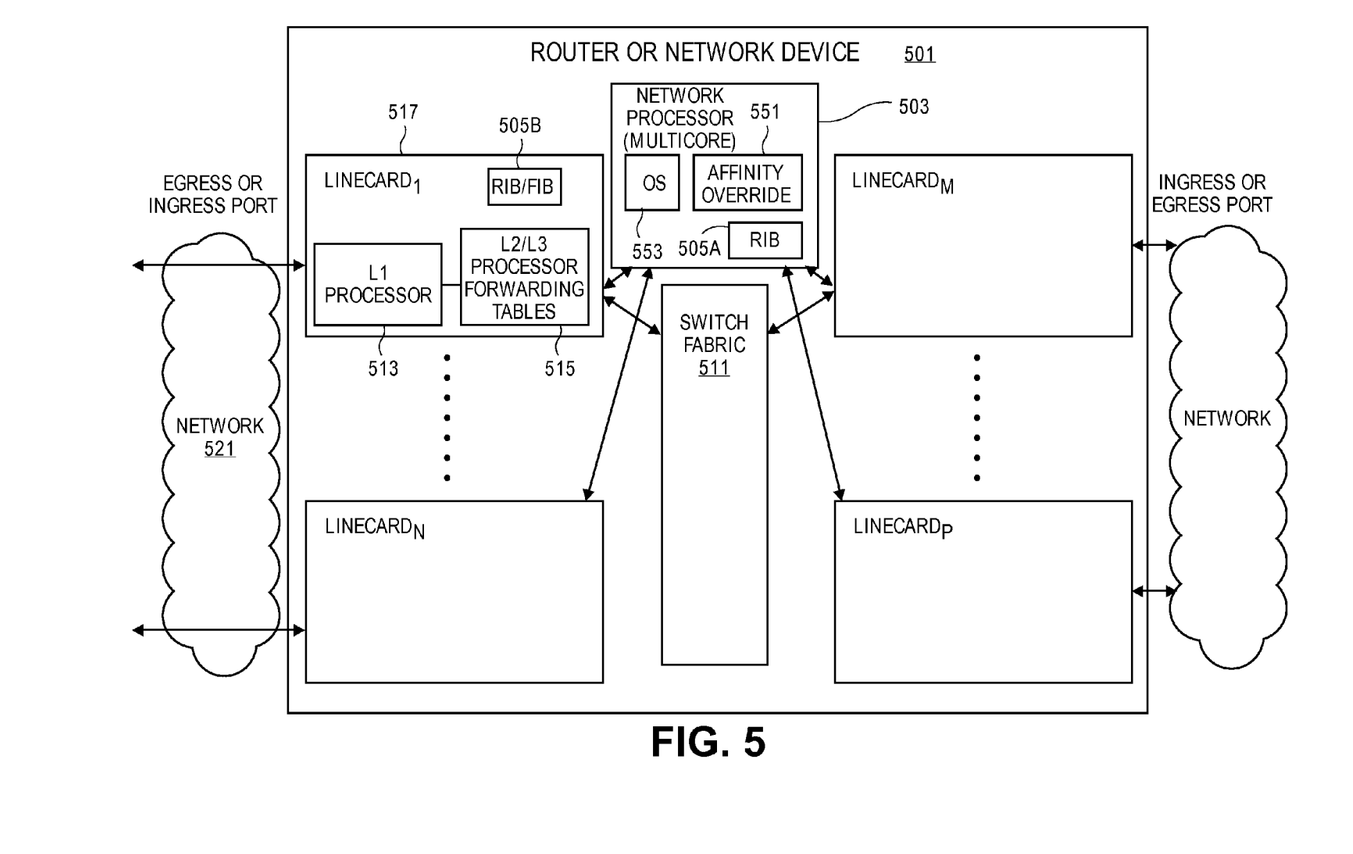
FIG. 5 is a diagram of one embodiment of a network device implementing the affinity override process.

FIG. 5 is a diagram of one embodiment of a network device implementing the affinity override process in a network device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 501 or network device or similar computing device. The router 501 can have any structure that enables it to receive data traffic and forward it toward its destination. The router 501 can include a multi-core network processor 503 or set of network processors that execute the functions of the router 501. A 'set,' as used herein, is any positive whole number of items including one item. In one embodiment, the multi-core network processor 503 or the set of network processors are symmetric and form a part of an SMP architecture. The router 501 or network element can execute network convergence computations or similar computationally demanding or time-sensitive process (e.g., via OSPF) (not shown) and as well as the affinity override 551, this functionality can be executed via the network processor 503 or other components of the router 501. The functionality and the processes implementing it can be managed via an operating system 552 or similar software architecture that manages the resources available to the network processor 503.

In particular, the affinity override functions can be implemented as modules in any combination of software, including firmware, and hardware within the router. The functions of the affinity override that are executed and implemented by the router 501 include those described further herein above. In the illustrated example, the functions are implemented by the network processor 503 that executes an affinity override 551 along with the routing information base 505A.

In one embodiment, the router 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the routing information base or forwarding information base 505B, or a relevant subset thereof. In some embodiments, the line cards 517 can also implement or facilitate the affinity override functions described herein above. The line cards 517 are in communication with one another via a switch fabric 511 and communicate with other nodes over attached networks 521 using Ethernet, fiber optic or similar communication links and media.

Figure 6A:
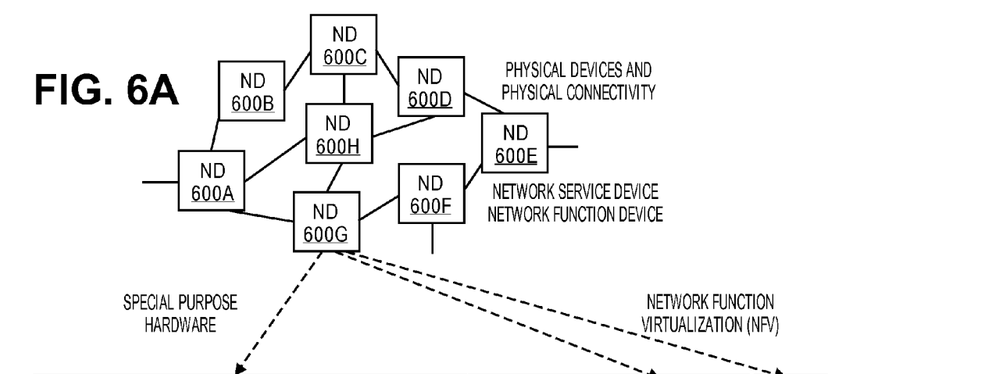
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS) 671A; and 2) a general purpose network device 604 that uses common off-the-shelf (COTS) processors and a standard OS 671B. The OS 671A, B in each system can implement the affinity override 673A, B as disclosed herein above.

The special-purpose network device 602 includes networking hardware 610 comprising compute resource(s) 612 (which typically include a set of one or more multi-core or symmetric processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

In one embodiment, the special network device 602 can implement affinity override 673A or a set of such modules to improve the efficiency in the execution of a high demand or time sensitive process such as processes that implement calculation of paths across the network as part of network convergence. The affinity override 673A can be implemented as part of the operating system 671A.

Figure 6B:
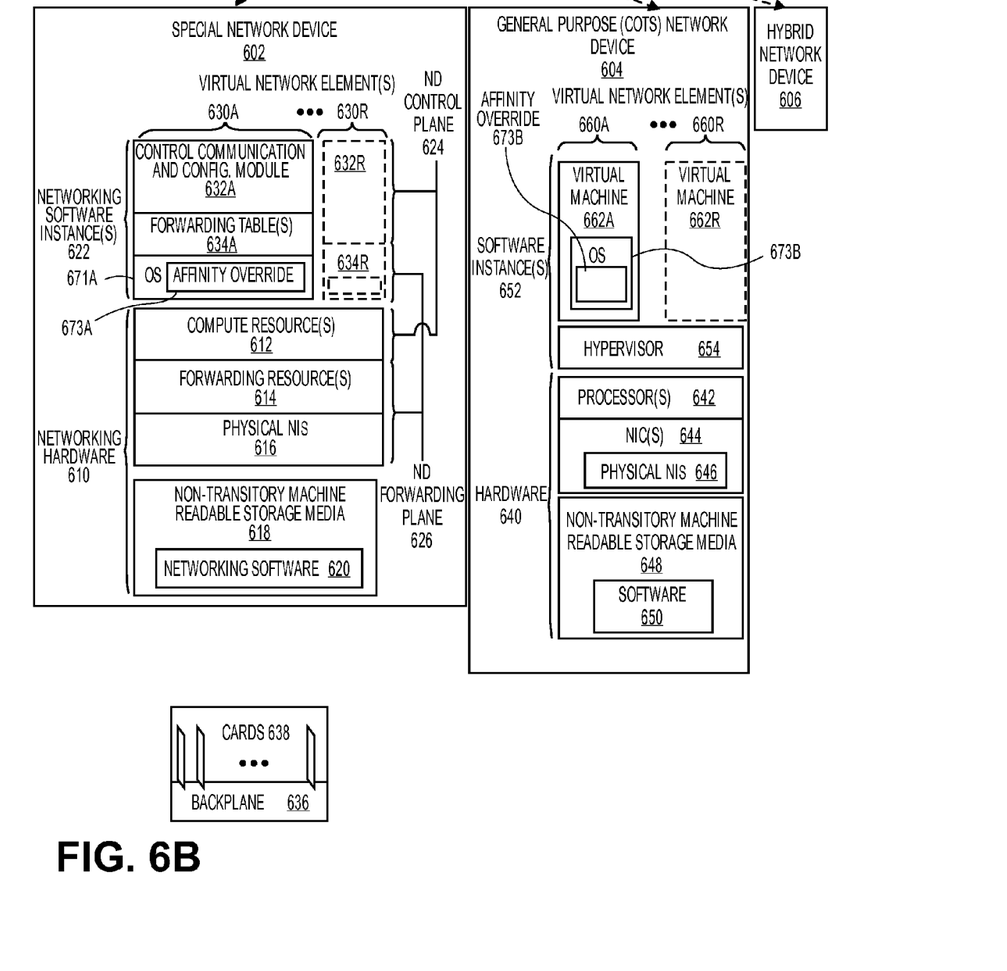
FIG. 6B illustrates an exemplary way to implement the special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 6442 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In one embodiment, the general purpose network device 604 can implement an OS 671B 463 or a set of such OS to manage the resources of each of the respective virtual machines 662A across the network. Similarly each of the OS 671B can include an affinity override 673Ble 463A can be executed by a virtual machine 462A or similarly implemented as a networking software instance 652. In other embodiments, any number of separate instances can be executed by different virtual machines 662A-R and the OS or affinity override can be moved between the varying instances.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS (each with an affinity override) in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a network device having a symmetric multi-processing (SMP) architecture, the method to improve response time for processes implementing routing algorithms in a network, the method to manage core assignments for the processes during a network convergence process, the method comprising the steps of:
   determining a number of interrupts or system events processed by a subset of cores of a set of cores of a central processing unit;
   identifying a core within the subset of cores with a lowest number of interrupts or system events processed;
   changing an affinity mask of at least one process implementing the routing algorithms during the network convergence to target the core within the subset of cores with a lowest number of interrupts or system events processed such that the at least one process is executed by the core with the lowest number of interrupts during the network convergence;
   storing the affinity mask prior to the changing of the affinity mask;
   checking whether the network convergence process has completed; and
   restoring the affinity mask to the stored affinity mask, after completion of the network convergence process.

2. The method of claim 1, wherein the network device having the SMP architecture is a site integration unit (SIU).

3. The method of claim 1, wherein the processes implementing routing algorithms in the network include at least one of hardware specific layer process (HSL), an open shortest path first process and a network service module process.

4. The method of claim 1, further comprising:
   checking whether the affinity mask of the at least one process implementing the routing algorithm is set to target the core within the subset of cores with a lowest number of interrupts or system events processed; and
   exiting the method without changing the affinity mask of the at least one process in response to affinity mask being set to target the core within the subset of cores with a lowest number of interrupts or system events processed.

5. A network device having a symmetric multi-processing (SMP) architecture configured to execute a method to improve response time for processes implementing routing algorithms in a network, the method to manage core assignments for the processes during a network convergence process, the network device comprising:
   a non-transitory machine-readable storage medium configured to store an operating system for the network device and an affinity override module; and
   a processor communicatively coupled to the non-transitory machine-readable storage medium, the processor having a set of cores for executing processes, the processor configured to execute the operating system and the affinity override module, the affinity override module configured to determine a number of interrupts or system events processed by a subset of cores of the set of cores, to identify a core within the subset of cores with a lowest number of interrupts or system events processed, to change an affinity mask of at least one process implementing the routing algorithms during the network convergence to target the core within the subset of cores with a lowest number of interrupts or system events processed such that the at least one process is executed by the core with the lowest number of interrupts during the network convergence, to store the affinity mask prior to the changing of the affinity mask, to check whether the network convergence process has completed, and to restore the affinity mask to the stored affinity mask, after completion of the network convergence process.

6. The network device of claim 5, wherein the network device having the SMP architecture is a site integration unit (SIU).

7. The network device of claim 5, wherein the processes implementing routing algorithms in the network include at least one of hardware specific layer process (HSL), an open shortest path first process and a network service module process.

8. The network device of claim 5, wherein the processor is further configured to execute the affinity override module, which is further configured to check whether the affinity mask of the at least one process implementing the routing algorithm is set to target the core within the subset of cores with a lowest number of interrupts or system events processed, and to exit the method without changing the affinity mask of the at least one process in response to affinity mask being set to target the core within the subset of cores with a lowest number of interrupts or system events processed.

9. A computing device having a symmetric multi-processing (SMP) architecture implementing a plurality of virtual machines for implementing network function virtualization (NFV), wherein a virtual machine from the plurality of virtual machines is configured to execute a method to improve response time for processes implementing routing algorithms in a network, the method to manage core assignments for the processes during a network convergence process, the computing device comprising:
  a non-transitory machine-readable storage medium configured to store an operating system for the computing device and an affinity override module; and
  a computer processor communicatively coupled to the non-transitory machine-readable storage medium, the computer processor to execute a virtual machine from the plurality of virtual machines, the computer processor having a set of cores for executing processes, the computer processor configured to execute the virtual machine that implements the operating system and the affinity override module, the affinity override module configured to determine a number of interrupts or system events processed by a subset of cores of the set of cores, to identify a core within the subset of cores with a lowest number of interrupts or system events processed, to change an affinity mask of at least one process implementing the routing algorithms during the network convergence to target the core within the subset of cores with a lowest number of interrupts or system events processed such that the at least one process is executed by the core with the lowest number of interrupts during the network convergence, to execute the virtual machine that implements the affinity override module, which is further configured to store the affinity mask prior to the changing of the affinity mask, to check whether the network convergence process has completed, and to restore the affinity mask to the stored affinity mask, after completion of the network convergence process.

10. The computing device of claim 9, wherein the computing device having the SMP architecture is a site integration unit (SIU).

11. The computing device of claim 9, wherein the processes implementing routing algorithms in the network include at least one of hardware specific layer process (HSL), an open shortest path first process and a network service module process.

12. The computing device of claim 9, wherein the computer processor is further configured to execute the virtual machine that implements the affinity override module, which is further configured to check whether the affinity mask of the at least one process implementing the routing algorithm is set to target the core within the subset of cores with a lowest number of interrupts or system events processed, and to exit the method without changing the affinity mask of the at least one process in response to affinity mask being set to target the core within the subset of cores with a lowest number of interrupts or system events processed.

* * * * *